Patented June 15, 1954

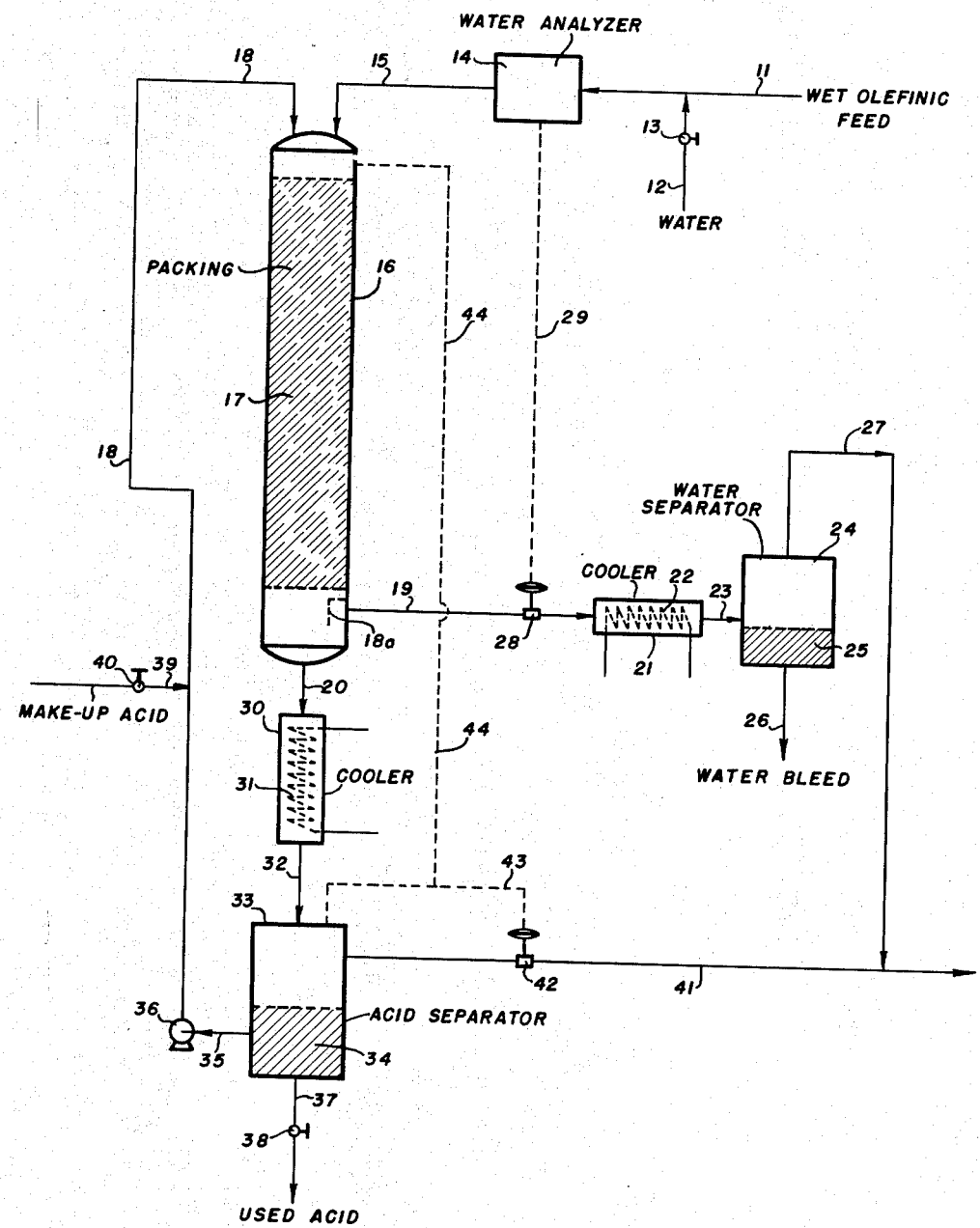

2,681,374

UNITED STATES PATENT OFFICE 2,681,374

CONTROL OF CATALYST HYDRATION

Sam R. Bethea, Baytown, Tex., assignor, by mesne assignments, to Standard Oil Development Company, Elizabeth, N. J., a corporation of Delaware Application April 14, 1951, Serial No. 221,050

6 Claims. (Cl. 260—683.15)

The present invention is directed to the polymerization of olefins. More particularly, the invention is directed to polymerization of olefins employing a phosphoric acid catalyst.

The invention may be described as involving a method for maintaining the strength of a liquid phosphoric acid catalyst in a conversion operation in which a catalyst contacts a water-containing hydrocarbon feed in a vaporized condition at an elevated temperature in a reaction zone and a product and liquid catalyst are withdrawn. The invention includes the steps of withdrawing from the reaction zone first and second streams which are separately cooled. The first stream is a stream of vaporous hydrocarbons containing water and the second stream is a stream of hydrocarbon and acid catalyst. The cooled first and second streams are separated, respectively, into a first hydrocarbon phase and a water phase and into a second hydrocarbon phase and an acid phase. The water phase is discarded and the first and second hydrocarbon phases may be combined. The acid phase is recycled to the contacting step and has a strength substantially the same as the acid catalyst.

The invention is particularly applicable to a catalytic polymerization process in which mono-olefins having from 3 to 6 carbon atoms in the molecule are polymerized. The mono-olefins forming the feed stock of the present invention include propylene, the butylenes, pentylenes and the hexylenes. Particularly desirable feed stocks are the mono-olefins having 3 and 4 carbon atoms in the molecule and including propylene and 1- and 2-butylene, and isobutylene.

The phosphoric acid employed in the practice of the present invention may have a strength in the range from about 75% to 115% by weight of $H_3PO_4$. A preferred acid strength is in the range from 100% to 110% $H_3PO_4$. Temperatures employed in the polymerization operation in accordance with the present invention may range from 280° to about 450° F., the preferred range being between 300° and 400° F. Quite satisfactory results are obtained when polymerizing propylene at 360° F.

The two streams are separately cooled to a temperature in the range from 80° to 200° F. Cooling water ordinarily available in the refinery will allow the obtaining of such temperature. The temperature to which the vaporous stream and the stream containing hydrocarbon and catalyst are cooled will ordinarily be sufficiently low to condense any condensible hydrocarbons therein which may be dissolved in the higher boiling hydrocarbons under the pressure employed in the system. Pressures employed in the practice of the present invention may range from about 300 to about 1000 lbs./sq. in. gauge or higher. The pressures may vary somewhat but are sufficiently low to maintain the olefinic feed in a vaporous condition at the polymerization temperatures mentioned before.

The mono-olefins and the liquid phosphoric acid catalyst are contacted in a reaction zone. The reaction zone is packed with an inert, substantially non-adsorbent packing material over which the liquid phosphoric acid is distributed as a film to insure good contact with the vaporized olefin. Examples of the type of packing material suitable in the practice of the present invention are given in U. S. Patent 2,136,785, issued to Davis on November 15, 1938. Besides the type of packing mentioned by Davis, supra, it is contemplated that the reaction vessel in accordance with the present invention may be filled or packed with other inert distributing means, such as carbon Raschig rings, or other well known carbon packing material which may be in the form of Berl saddles and the like. Suitable packing materials are described in U. S. Patent 2,135,793 to Brooke and U. S. Patent 2,186,021 to Holm et al. In such an operation the vaporized mono-olefin and the phosphoric acid preferably flow concurrently. The preheated vaporized olefinic feed and phosphoric acid catalyst are introduced into the top of the reactor. The liquid catalyst flows down over the packing and out the bottom into a separator from which it is pumped back to the reactor inlet. Any hydrocarbon phase that may be condensed in the reactor near the reactor outlet also gravitates to the bottom of the reactor.

As described, the vaporous stream is separately cooled to a temperature sufficiently low to cause substantial condensation of the hydrocarbon and the water contained therein. The stream of hydrocarbon and catalyst are also separately cooled to allow substantial condensation of the hydrocarbon. By virtue of cooling the vaporous stream, the water contained therein is condensed and may be separated as a water phase. The only other water lost from the system will be that dissolved in the liquid hydrocarbon phase. Thus, by properly proportioning the vaporous stream and the stream of hydrocarbon and catalyst, it is possible to control exactly the amount of water retained in the system, and, consequently, the concentration of the acid catalyst.

The invention will now be described in more detail by reference to the drawing in which the single figure is an elevational view of a flow diagram of a preferred mode thereof.

Referring now to the drawing, numeral 11 designates a charge line through which a wet olefinic feed including propylene and propane, for example, is introduced into the system. If the water content of the feed is very low it may be desirable to adjust same by introducing a controlled amount of water through branch line 12 which connects into line 11 and which is controlled by valve 13. The water-containing hydrocarbon feed passes into a water analyzer 14 which may be a suitable instrument for measuring water, such as a Foxboro Dynalogue, whereby the water content of the hydrocarbon feed is measured continuously. The wet olefinic feed is introduced into the system in a vaporized condition and its temperature may be suitably adjusted to a temperature in the range between 280° and 400° F., suitable for polymerization in a manner to be described. The olefinic feed leaves analyzer 14 by line 15 and discharges thereby into a reaction zone 16 containing a packed section 17 which may be a suitable body of inert packing material, such as that described before. Phosphoric acid catalyst is introduced into reaction zone 16 by line 18 from a source which will be described further and flows concurrently with the vaporized olefinic feed over the packing 17, allowing intimate contact therewith and causing polymerization of the propylene contained therein. It is understood, of course, that the temperatures in reaction zone 16 are within the range given and that reaction zone 16 may be provided with heat control means to maintain this temperature. Likewise, pressures are suitably adjusted on the system to maintain a vapor phase.

The reaction zone 16 is provided with a baffle member 18a to allow withdrawal of a vaporous stream by line 19. Reaction zone 16 is also provided with line 20 to allow withdrawal of a second stream thereby. The vaporous stream withdrawn by line 19 is discharged thereby into a cooler 21 which is provided with a cooling coil 22. The cooled stream then discharges by line 23 into a water separation zone 24 which is of sufficient capacity to allow a residence time for separation of a water phase which is generally indicated by the shaded portion 25. This water phase may be discharged from the system by line 26 while the hydrocarbons forming an upper layer in separator 24 are withdrawn by line 27.

Line 19 is provided with a control valve 28 which is connected by suitable connection means 29 to water analyzer 14. Valve 28 may be of the pneumatic type and may be controlled responsive to electrical signals from water analyzer 14 through control means 29.

A stream of hydrocarbon and catalyst is withdrawn by line 20 from reaction zone 16 and is cooled in cooler 30 containing a cooler coil 31. The cooled stream then discharges by line 32 into an acid separation zone 33 which, like separator 24, is of sufficient capacity to allow a residence time for formation of an acid phase and a hydrocarbon phase. The acid phase in separator 33 is generally indicated as a shaded portion 34. The acid phase may be recycled to reaction zone 16 by line 35, pump 36 and line 18 as has been described. Acid separator 33 is provided with a discharge line 37 controlled by valve 38 for withdrawal of used acid from time to time such as to prevent contamination thereof with carbonaceous material. When used acid is withdrawn by line 37 a sufficient amount of make-up acid may be added to line 18 by line 39 controlled by valve 40 to maintain a sufficient quantity of acid in the system.

The hydrocarbon phase is withdrawn from separator 33 by line 41 controlled by valve 42. This hydrocarbon phase may be combined with the hydrocarbon phase withdrawn from separator 24 by line 27; therefore, line 27 ties into line 41. Valve 42 may be a pressure responsive valve and may be of the pneumatic type and suitably may be automatically controlled by connecting same through control means 43 and 44 to reaction zone 16. Alternatively, the valve 42 may be controlled by having a suitable connection to separator 33 as shown.

In the operation of the present invention a propylene-containing feed, for example, would be introduced into line 11 and charged through analyzer 14 and line 15 into reaction zone 16 where it will be contacted with phosphoric acid introduced by line 18, conditions being maintained in reaction zone 16 to cause polymerization of the propylene. In the bottom of reaction zone 16 a vaporous stream would be withdrawn by line 19 and a second stream by line 20. The vaporous stream would be so proportioned so that the amount of water withdrawn thereby, due to its partial pressure under the conditions maintained in reaction zone 16, would be sufficient to maintain the acid strength at the desired level, accounting, of course, for the amount of water which would be contained in the hydrocarbon stream discharged by line 41. By continuously withdrawing a vapor stream, condensing same and discarding water, it is possible to control within very narrow limits the hydration of the catalyst and thus allow control of the system.

By virtue of a control system including analyzer 14, valve 28 and valve 42, it is possible to operate the process, described with respect to the drawing, in an automatic manner. Assuming a wet olefinic feed is charged to analyzer 14, the analyzer will transmit a signal through the connection means 29 to valve 28 which will automatically open valve 28 to proportion properly the stream flowing through line 19 with respect to the stream flowing through line 41 to allow withdrawal of the required amount of vaporous stream containing hydrocarbon and water. The valve 42 is a back pressure regulator and may operate from the reaction zone 16 or from the acid separator 33 in a well known manner to control flow through line 41. If the water content of the incoming feed is such as to require release of increased amounts of vaporous hydrocarbon stream flowing through line 19, the signal to valve 28 would cause it to be opened and to change the relative proportion of the streams in line 19 and line 41. Similarly, if the water content of the feed should decrease, valve 28 would be partially closed to change the proportions of the two streams to release less of the stream in line 19 in proportion to the stream in line 41.

Although not shown in the drawing, the hydrocarbon streams leaving the system by lines 27 and 41 may be separately contacted with a suitable material such as activated alumina, silica gel, bauxite or clay to remove any phosphoric acid which may be entrained therein and to prevent corrosion of subsequent fractionating equipment.

The invention will be illustrated by the following examples:

*Example I*

An operation is conducted with a hydrocarbon feed consisting of 60 mole per cent of propylene and 40 mole per cent of propane. The reaction temperature is 360° F., the reaction pressure is 500 p. s. i. g. and the recycled acid is 100% H₃PO₄. In this operation 20 parts of feed containing 250 parts per million of water is introduced into the system and it is desired to maintain the acid at 100% H₃PO₄. Under these conditions the vapor phase stream withdrawn by line 19 is withdrawn in an amount of 7.6 parts while the hydrocarbon stream withdrawn by line 20 is 12.4 parts. The amount of water in the stream withdrawn by line 19 is $4.38 \times 10^{-3}$ parts, which is the amount introduced with the feed, minus that contained in the stream withdrawn by line 41; the stream withdrawn by line 41 contains 50 parts per million of water. The strength of the acid recycled by lines 35 and 18 is substantially 100% H₃PO₄.

*Example II*

In another operation in which conditions are maintained similar to that in Example I, 20 parts of an olefinic feed containing 100 parts per million of water is charged into the system. Again if it is desired to maintain the acid strength at 100% H₃PO₄ with a feed having this water content, 4.45 parts of the stream withdrawn by line 19 are discharged and 15.55 parts of the hydrocarbon stream withdrawn by line 20 are discharged. The vaporous stream discharged by line 19 contains $1.22 \times 10^{-3}$ parts of water while the stream withdrawn by line 41 contains 50 parts per million of water. The acid phase recycled by lines 35 and 18 has a strength substantially 100% H₃PO₄.

The present invention has been described and illustrated with respect to a polymerization operation in which a mono-olefin is polymerized to form a polymer. It is understood that the invention is not to be limited to that particular catalytic conversion operation. The invention may be employed in other catalytic operations such as alkylation reactions where phosphoric acid catalysts of the type illustrated are employed. The invention may be practiced in any system where liquid phosphoric acid is used and water of hydration is lost by virtue of the high temperatures of a particular reaction and where a vapor phase is present in the reaction zone. Illustrative of such operations in which liquid phosphoric acid is contacted with hydrocarbons or their derivatives at an elevated temperature include the alkylation of aromatics or of phenols with olefins.

While the invention is particularly adapted to the control of a particular acid strength, it is apparent that by virtue of the present invention in which a vapor stream is withdrawn in which the water is concentrated it is possible to either hydrate or dehydrate the catalyst. In short, it may be desirable to start an operation with a catalyst having a low acidity within the range given and then gradually increase the acid strength by increasing the amount of water withdrawn. However, on other conditions it may be desirable to begin with a strong acid and gradually hydrate the acid to lower the acid strength. It will be apparent that the present invention allows such operations to be carried out easily merely by properly proportioning the amount of the vaporous stream to be discharged.

It is understood, of course, that the amount of vaporous stream containing hydrocarbons and water withdrawn in accordance with the present invention will depend on the operating conditions and the strength of acid employed as well as the water content of the incoming feed. Since the vapor pressure of water over phosphoric acid is well known, it is believed unnecessary to give further details thereof here. For example, this is well described in U. S. 2,135,793 to Brooke and in U. S. 2,136,785 to Davis.

The nature and objects of the present invention having been completely described and illustrated, what I wish to claim as new and useful and to secure by Letters Patent is:

1. In a catalytic conversion process in which a wet olefinic hydrocarbon feed in vaporous condition is contacted in a reaction zone with a liquid phosphoric acid catalyst having a strength no less than 75% H₃PO₄ to form a polymer, the method of maintaining the acid strength of the catalyst which comprises contacting the said hydrocarbon feed and the acid catalyst under conditions including a temperature at least 280° F. to form a product including vaporous hydrocarbon product, water and catalyst, withdrawing from a lower point in said zone a first stream of vaporous hydrocarbon containing water and withdrawing from a point substantially below the point where the first stream is withdrawn a second stream of hydrocarbon and acid catalyst, said first stream and said second stream being proportioned with respect to an amount of water introduced with the feed to control the strength of the acid within the range given, separately cooling the first and second streams to a temperature no greater than 200° F., separating the cooled first stream into a first hydrocarbon phase and a water phase, discarding the water phase, separating the cooled second stream into a second hydrocarbon phase and an acid phase, and recovering and recycling to said contacting step said acid phase having a strength substantially the same as the acid catalyst, the first stream of vaporous hydrocarbon containing water being withdrawn in an amount sufficient to maintain the acid strength of the catalyst.

2. In a catalytic polymerization process in which a wet olefinic feed in vaporous condition is contacted in a reaction zone with a liquid phosphoric acid catalyst having a strength in the range from about 75% to 115% H₃PO₄ to form a polymer, the method of maintaining the acid strength of the catalyst which comprises contacting the olefinic feed and the acid catalyst under conditions including a temperature in the range from 280° to 450° F. to form a product including vaporous hydrocarbon product, water and catalyst, withdrawing from a lower point in said zone a first stream of vaporous hydrocarbon containing water and withdrawing from a point substantially below the point where the first stream is withdrawn a second stream of hydrocarbon and acid catalyst, said first stream and said second stream being proportioned with respect to an amount of water introduced with the feed to control the strength of the acid within the range given, separately cooling the first and second streams to a temperature in the range from 80° to 200° F., separating the cooled first stream into a first hydrocarbon phase and a water phase, discarding the water phase, separating the cooled second stream into a second hydrocarbon phase and an acid phase and recovering and recycling to said contacting step said acid phase having a strength substantially the same as the acid catalyst.

3. A method for forming a polymer which comprises polymerizing a vaporized mono-olefin having from 3 to 6 carbon atoms in the molecule containing water by contacting same in a reaction zone with a liquid phosphoric acid catalyst having a strength in the range from 75% to 115% $H_3PO_4$ at a temperature from 280° to 400° F. and at a pressure of from 300 to 1000 p. s. i. g. to form a polymerized product including vaporous hydrocarbon product, water and catalyst, withdrawing from a lower point in said zone a first stream of vaporous hydrocarbon containing water and withdrawing from a point substantially below the point where the first stream is withdrawn a second stream of hydrocarbon and acid catalyst, said first stream and said second stream being proportioned with respect to an amount of water introduced with the feed to control the strength of the acid within the range given, separately cooling the first and second streams to a temperature in the range between 80° and 200° F., separating the cooled first stream into a first hydrocarbon phase and a water phase, discarding the water phase, separating the cooled second stream into a second hydrocarbon phase and an acid phase and recovering and recycling to said contacting step said acid phase having a strength substantially the same as the acid catalyst, the first stream being withdrawn in an amount sufficient to maintain the strength of the acid in the range given and to compensate for the water introduced with the olefinic feed.

4. A method in accordance with claim 3 in which the mono-olefin is propylene.

5. A method in accordance with claim 3 in which the mono-olefin is butylene.

6. A method in accordance with claim 3 in which the mono-olefin is a mixture of propylene and butylene.

References Cited in the file of this patent

UNITED STATES PATENTS

| Number | Name | Date |
|---|---|---|
| 2,136,785 | Davis | Nov. 15, 1938 |
| 2,378,439 | Schlesman | June 19, 1945 |
| 2,429,622 | Hirsch | Oct. 28, 1947 |
| 2,436,571 | Heinrich | Feb. 24, 1948 |
| 2,592,428 | Kemp et al. | Apr. 8, 1952 |